US012801612B2

(12) United States Patent
Jin et al.

(10) Patent No.: US 12,801,612 B2
(45) Date of Patent: Nov. 17, 2026

(54) METADATA-BASED DATA RETRIEVAL AND PROCESSING USING MACHINE LEARNING TECHNOLOGIES

(71) Applicant: eBay Inc., San Jose, CA (US)

(72) Inventors: Luchao Jin, Houston, TX (US); Morteza Moazami Goudarzi, Cambridge, MA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/999,720

(22) Filed: Dec. 23, 2024

(65) Prior Publication Data

US 2026/0178590 A1 Jun. 25, 2026

(51) Int. Cl.
*G06F 16/00* (2019.01)
*G06F 16/2455* (2019.01)
*G06F 16/2457* (2019.01)

(52) U.S. Cl.
CPC .. *G06F 16/24564* (2019.01); *G06F 16/24578* (2019.01)

(58) Field of Classification Search
None
See application file for complete search history.

(56) References Cited

U.S. PATENT DOCUMENTS 10,346,905 B1 * 7/2019 Chang .................... G06Q 40/00
10,977,315 B2 4/2021 Dupont et al.
11,062,042 B1 * 7/2021 McKervey ............ G06F 16/137
11,321,329 B1 5/2022 Shih et al.
11,755,592 B2 9/2023 Dain et al.
11,861,321 B1 1/2024 O'kelly et al.
12,020,140 B1 6/2024 Mondlock
12,111,859 B2 10/2024 Siebel et al.
12,242,468 B1 * 3/2025 Brenner ................ G06F 16/242
12,321,343 B1 * 6/2025 Mehta .................... G06F 16/243
12,339,845 B1 * 6/2025 Birru ................. G06F 16/24564
2007/0073651 A1 * 3/2007 Imielinski ............... G06F 16/24
2016/0085813 A1 * 3/2016 Setty ................. G06F 16/24575 707/734
2018/0004752 A1 * 1/2018 Deng ................ G06F 16/24578
2018/0174067 A1 * 6/2018 Spiro ....................... G01D 9/00
(Continued)

FOREIGN PATENT DOCUMENTS

CN 108897808 A * 11/2018
CN 122262086 A 6/2026
EP 4764897 A1 6/2026

OTHER PUBLICATIONS

Poliakov, Mykhailo, "Multi Meta RAG Improving RAG for Multi Hop Queries using Database Filtering with LLM Extracted Metadata", Cornell University Computer Science Computation and Language, Aug. 2024, 10 pgs.
(Continued)

*Primary Examiner* — Hasanul Mobin
(74) *Attorney, Agent, or Firm* — FIG. 1 Patents

(57) ABSTRACT

A user query is received. Based on the user query, one or more data files are identified. Each data file is associated with metadata relevant to the user query. One or more data chunks are determined from the one or more data files using a first machine learning model. A response to the user query is generated using a second machine learning model. The response is a synthesized response that is derived from the content of the one or more data chunks.

20 Claims, 8 Drawing Sheets

(56) References Cited

U.S. PATENT DOCUMENTS

| | | | | |
|---|---|---|---|---|
| 2018/0225590 | A1* | 8/2018 | Altaf | G06F 16/332 |
| 2018/0349398 | A1* | 12/2018 | Ardite | G06F 16/432 |
| 2019/0050937 | A1* | 2/2019 | Fries | G06Q 30/0639 |
| 2020/0183987 | A1* | 6/2020 | Carrillo | G06F 16/958 |
| 2024/0126795 | A1 | 4/2024 | Zhong et al. | |
| 2024/0289863 | A1 | 8/2024 | Smith Lewis et al. | |
| 2024/0354436 | A1 | 10/2024 | Mukherjee et al. | |
| 2024/0378204 | A1* | 11/2024 | Hottelier | G06F 16/254 |
| 2025/0131247 | A1* | 4/2025 | Mondlock | G06N 5/022 |
| 2025/0217340 | A1* | 7/2025 | Bariki | G06F 16/783 |
| 2026/0057003 | A1* | 2/2026 | Vouitsis | G06F 16/3325 |
| 2026/0073253 | A1* | 3/2026 | Zhang | G06N 5/04 |

OTHER PUBLICATIONS

EP Search Report for Application No. 25222336.7, mailed May 18, 2026, 7 pages.

* cited by examiner

METADATA-BASED DATA RETRIEVAL AND PROCESSING USING MACHINE LEARNING TECHNOLOGIES

TECHNICAL FIELD

The present disclosure generally relates to data processing using machine learning technologies. More particularly, various embodiments described herein provide for systems, methods, techniques, instruction sequences, and devices that facilitate metadata-based data retrieval and content generation using machine learning and large language model (LLM) technologies.

BACKGROUND

Traditional Retrieval-Augmented Generation (RAG) systems that utilize vector databases face several challenges in their implementation and operation. The incorporation of vector databases in these systems has led to increased complexity in system architecture and elevated operational costs. This complexity arises from the need to process and store vast amounts of data in vector format, which requires significant computational resources. Another limitation of vector database-based RAG systems is the heightened latency during the process of conducting relevancy determination between queries and data chunks. The reliance on vector databases in RAG systems can also lead to scalability issues as the volume of data grows.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

DETAILED DESCRIPTION

Figure 1:
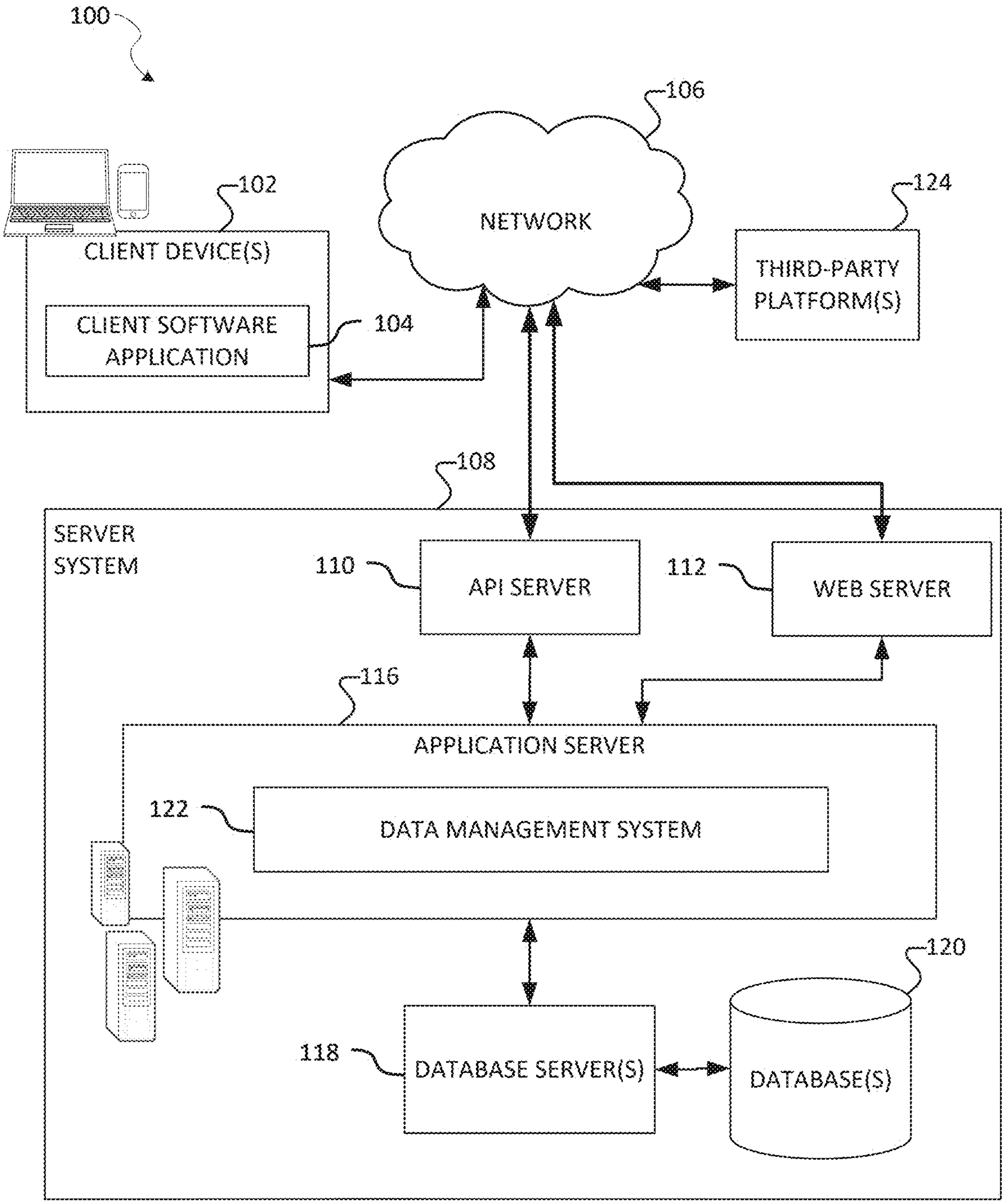
FIG. 1 is a block diagram showing an example data system that includes a data management system, according to various examples of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details. Furthermore, well-known features may be omitted or simplified in order not to obscure the described embodiments.

Various examples include systems, methods, and non-transitory computer-readable media that facilitate metadata-based data retrieval and content generation using machine learning and large language model (LLM) technologies, according to various examples of the present disclosure. Specifically, various embodiments introduce an enhanced Retrieval-Augmented Generation (RAG) approach that overcomes the limitations of traditional systems, which typically rely on vectors for tasks like information retrieval, relevancy determination, and text generation. The enhanced RAG approach utilizes a metadata-driven architecture alongside a reranker language model (also referred to as a “reranker model” or a “reranker”) to improve system efficiency and performance. Specifically, metadata is generated for each data file in a customer’s source data, representing one or more business rules or policies. Metadata is then used to retrieve or filter data files most relevant to user queries. The retrieved files can be passed to a reranker ML model to identify data chunks that are more relevant to the queries. The reranker ML model uses pairwise comparisons to evaluate each data chunk’s relevance. This approach enhances search result relevance compared to traditional similarity searches in vector-based systems. Based on the evaluation, the top-ranked chunks selected by the reranker model are sent to a large language model, which generates responses that are contextually appropriate to user queries. The enhanced RAG approach eliminates the need to generate vectors and maintain a vector database for RAG tasks, reducing computational and storage costs and resulting in a more cost-effective solution.

In various embodiments, Retrieval-Augmented Generation (RAG) refers to a data architecture that combines two components: a retriever and a generator. The retriever searches a large corpus of data (e.g., customers’ raw source data) to fetch relevant information, while the generator uses this retrieved data to produce coherent and contextually relevant natural language responses (e.g., responses to user queries). This approach enhances the generation process by incorporating external knowledge, allowing the model to provide more accurate and appropriate answers, especially in tasks such as question answering, summarization, and document generation.

In various embodiments, a data management system receives user queries. A user query can refer to the term or phrase that a customer (also referred to as customer entity) types into a user interface when looking for information, such as a product, a service, or answers to questions related to recent transactions. A user query may take different forms depending on the user's intention and the context in which the query is made. On one hand, it can be a traditional search query, such as searching for a particular item, service, or piece of information. This type of query can include keywords or terms that the user believes will help locate the desired resource—examples include "running shoes under $100" or "24-hour pharmacy near me." On the other hand, a user's query might be an inquiry related to a specific item they already know about or have interacted with. Such inquiries often involve clarifications, updates, or next steps regarding a transaction or purchase (e.g., "Where is my order?" or "How do I return this product?"). This way, user queries can range from initial searches designed to discover new options to follow-up inquiries that help manage ongoing transactions, orders, or services.

In various embodiments, the data management system identifies one or more data files based on a received user query. Each data file can be associated with metadata that is relevant to the user query. Metadata can be generated using a large language model or a classification model. Specifically, metadata associated with each data file serves as a structured representation of the file's content and characteristics. This structured representation allows the system to quickly identify and retrieve relevant documents based on their metadata attributes when processing user queries. Additionally, the metadata generation process follows specific rules associated with each data file. When using a large language model (or a classification model) for metadata generation, the model analyzes the content of each file to create appropriate metadata tags that describe and categorize the information contained within. This metadata tagging process allows the system to understand and represent the content of each file in a structured format.

In various embodiments, the data management system uses a machine learning model (e.g., the first machine learning model) to determine one or more data chunks from the one or more data files. The first machine learning model can be a reranker model. Specifically, the reranker model evaluates and ranks documents based on their relevance to the original query using pairwise comparisons, which enhances search result relevance. The reranker model can be trained based on the source data associated with a particular customer entity to improve its performance in handling queries related to the customer entity. When processing files, the reranker model identifies a plurality of data files based on the user query and ranks them according to their relevance, including assigning scores to each candidate file based on their relevance to the query and sorting the files by such scores. The system then selects data chunks from a threshold number of top-ranked data files. After the model identifies the most relevant data chunks, these chunks are then prepared for the next stage of processing, e.g., serving the chunks as model input for generating responses to user queries.

In various embodiments, the data management system uses a machine learning model (e.g., the second machine learning model) to generate a response to the user query. The second machine learning model can be a large language model. The response is derived from (or generated based on) the content of the one or more data chunks. In various embodiments, the data management system formulates a response to a question in the received user query based on the content of the identified data chunks. Specifically, the response generation process begins with the generation of a specific prompt based on the selected data chunks. This prompt serves as input for the large language model, guiding it to generate contextually appropriate responses to the user query. The large language model analyzes the content of the provided data chunks to formulate responses that address the questions or requirements presented in the query. This approach ensures that the generated responses are grounded in the most relevant content from the retrieved documents, rather than relying solely on the model's pre-trained knowledge and/or on multiple files without relevance assessment.

This allows the model to generate more accurate and contextually appropriate responses, thereby improving model performance.

In various embodiments, the data management system causes display of the response on a user interface via which the user query was received. The data management system completes the response generation process by displaying the formulated (or synthesized) responses through the user interface where the original query was submitted. This helps create a seamless interaction cycle between the user and the data management system.

In various embodiments, the data management system generates metadata for a customer entity's raw source data and stores the metadata in a designated database beforehand for efficient file retrieval.

In particular, the data management system identifies source data associated with a customer entity. The source data includes a plurality of data files. The data management system then generates metadata for each data file based on one or more rules associated with each data file. For each file, the data management system generates metadata based on specific rules associated with that file. The metadata generation can be performed using either a large language model or a classification model to analyze and tag (via metadata) the content appropriately. These rules guide how the metadata is structured and what attributes are captured for each file. The data management system then stores metadata associated with the plurality of data files in a designated database. This database serves as a centralized repository for all metadata associated with the customer's data files. The storage of metadata allows for efficient retrieval of relevant files when processing user queries.

This metadata-driven approach provides an alternative to traditional vector database implementations. By storing structured metadata rather than vector embeddings, the system can efficiently filter and retrieve relevant documents while reducing computational complexity and operational costs. The metadata database facilitates identification of relevant documents based on their attributes and relationship to user queries.

In various embodiments, the data management system determines one or more rules associated with the user query in response to receiving a user query. The data management system filters the plurality of data files to identify the one or more data files based on the one or more rules. Each file in the one or more data files is associated with metadata that represents the rules. Specifically, when the data management system receives a user query, it initiates a rule-based matching (or filtering) process to identify relevant data files. The rules serve as matching criteria for processing the plurality of data files stored in the system. The matching process evaluates the metadata of all available data files against the rules associated with the query to identify matches with the determined rules. Each data file in the system contains metadata that represents one or more rules. This evaluation allows the system to identify only those files whose metadata attributes align with the query-specific rules.

Under this approach, the data management system leverages the pre-generated metadata stored in the database to perform this matching (or filtering) efficiently, without requiring vector-based similarity searches. This process ensures that subsequent processing steps (or operations), such as chunk generation and reranking, are performed only on the most relevant subset of documents.

In various embodiments, the data management system identifies a set of data files based on the user query. Each data file is associated with metadata that is relevant to the user query described herein. The data management system ranks the set of data files based on the relevancy between each data file and the user query and selects the one or more data files from a threshold number of top-ranked data files from the set of data files for generating the one or more data chunks described herein.

In various embodiments, the data management system generates prompts based on the data chunks that were identified and ranked as most relevant to the user query and uses a large language model to generate responses to the received user query based on the prompts.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system 122 (also referred to as system 122), according to various examples of the present disclosure. By including the data management system 122, the data system 100 can facilitate metadata-based data retrieval and content generation using machine learning and large language model (LLM) technologies. As shown, the data system 100 includes one or more client devices 102, a server system 108, and a network 106 (e.g., Internet, wide-area-network (WAN), local-area-network (LAN), wireless network) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104.

The server system 108 supports various services and operations that are provided to the client software application 104 by the data management system 122. Such operations include transmitting data from the data management system 122 to the client software application 104, receiving data from the client software application 104 at the data management system 122, and the data management system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation, user registration; login functionality; data object operations (e.g., generating, storing, retrieving, encrypting, decrypting, transferring, access rights, licensing); and/or user communications.

Through one or more web-based interfaces (e.g., web-based user interfaces), the web server 112 can support various functionality of the data management system 122 of the application server 116.

The environment 100 can also comprise one or more external systems 124. The external system(s) 124 can be a third-party system that performs data operations or processing for the network system 108. For example, the external system(s) 124 can comprise a large language model (LLM) or generative artificial intelligence (AI) system that processes data on behalf of the network system 108. The LLM is a trained model configured to generate text and perform natural language processing tasks such as classifying an intent of messages.

Figure 2:
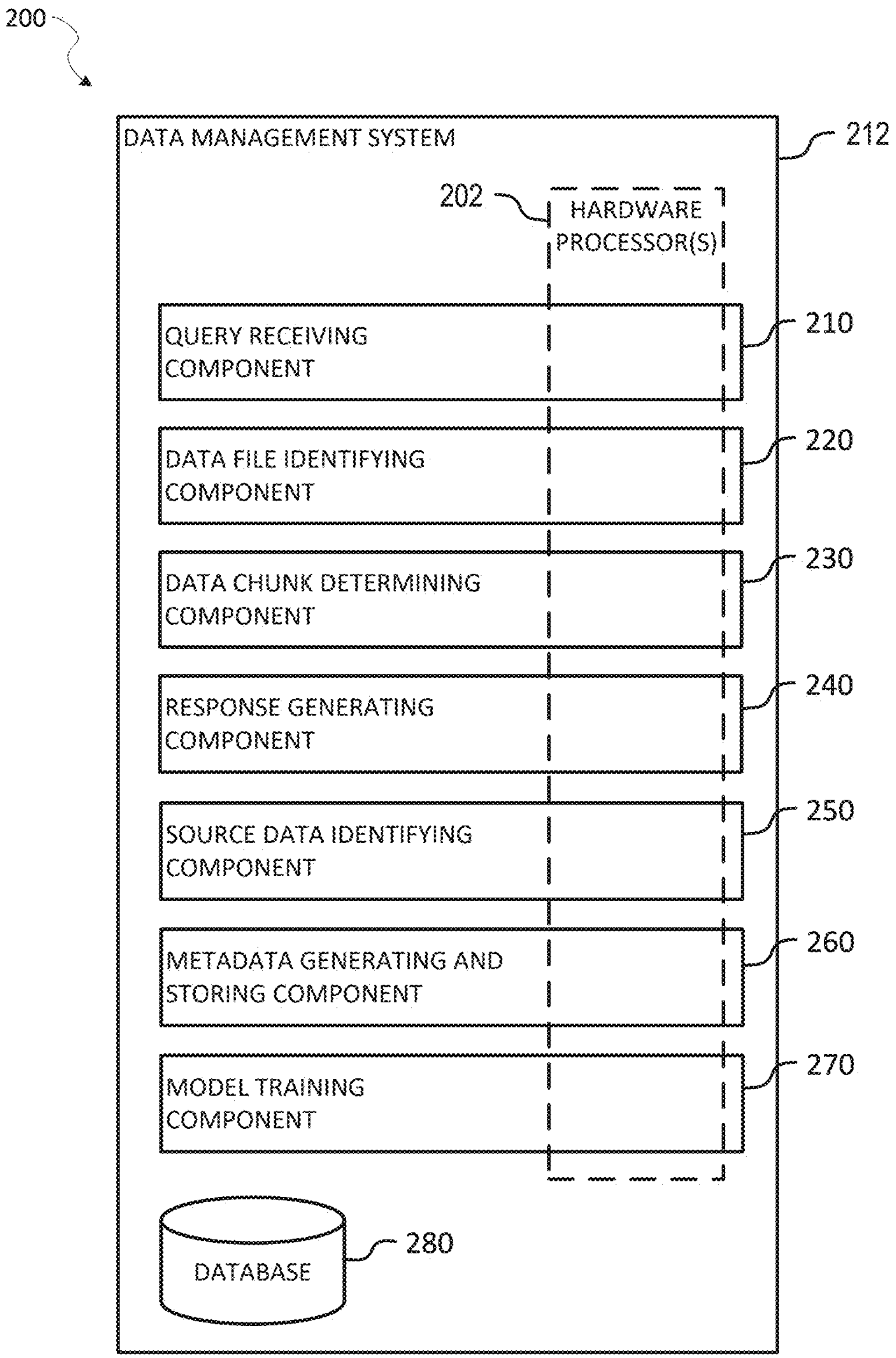
FIG. 2 is a block diagram illustrating an example data management system that facilitates metadata-based data retrieval and content generation using machine learning and large language model (LLM) technologies, according to various examples of the present disclosure.

FIG. 2 is a block diagram 200 illustrating an example data management system 212 that facilitates metadata-based data retrieval and content generation using machine learning and large language model (LLM) technologies, according to various examples of the present disclosure. For some examples, the data management system 212 represents an example of the data management system 122 described with respect to FIG. 1. As shown, the data management system 212 comprises a query receiving component 210, a data file identifying component 220, a data chunk determining component 230, a response generating component 240, a source data identifying component 250, a metadata generating and storing component 260, and a model training component 270. According to various examples, one or more of the query receiving component 210, the data file identifying component 220, the data chunk determining component 230, the response generating component 240, the source data identifying component 250, the metadata generating and storing component 260, and the model training component 270 are implemented by one or more hardware processors 202. Data generated by one or more of the query receiving component 210, the data file identifying component 220, the data chunk determining component 230, the response generating component 240, the source data identifying component 250, the metadata generating and storing component 260, and the model training component 270 may be stored in a database (or datastore) 280 of the data management system 212.

The query receiving component 210 is configured to receive user queries. A user query can refer to the term or phrase that a customer (also referred to as customer entity) types into a user interface when looking for information, such as a product, a service, or answers to questions related to recent transactions.

The data file identifying component 220 is configured to identify one or more data files based on a received user query. Each data file can be associated with metadata that is relevant to the user query. In particular, the data file identifying component 220 is configured to identify a set of data files based on the received user query and rank the set of data files based on the relevancy between each data file and the user query. The one or more data files are then selected from a threshold number of top-ranked data files from the set of data files for generating the one or more data chunks described herein.

The data file identifying component 220 is further configured to determine one or more rules associated with the user query in response to receiving a user query. The plurality of data files is then filtered to identify data files that match based on the one or more rules. Each file in the identified data files is associated with metadata that represents the rules.

The data chunk determining component 230 is configured to use a machine learning model (e.g., the first machine learning model) to determine one or more data chunks from the one or more data files. The first machine learning model can be a reranker model. The reranker model evaluates and ranks documents based on their relevance to the received query using pairwise comparisons described herein.

The response generating component 240 is configured to use a machine learning model (e.g., the second machine learning model) to generate a response to the user query. The second machine learning model can be a large language model. The response is derived from (or generated based on) the content of the one or more data chunks. Specifically, the response generating component 240 is further configured to generate prompts based on determined data chunks. Prompts serve as inputs for the large language model, guiding it to generate contextually appropriate responses to the queries. The response generating component 240 uses the large language model to analyze the content of the data chunks and formulate responses that address the questions or requirements presented in the queries.

The source data identifying component 250 is configured to identify source data associated with a customer entity. The source data can include a plurality of data files related to business rules and policies. Business rules can refer to guidelines, conditions, or criteria that govern how a business operates. For example, rules related to discounts, eligibility for refunds, or product return policies. These rules help in defining the logic and behavior of a business process. Policies can refer to documented principles or guidelines that help manage and guide decision-making within the business. Examples include refund policies, shipping policies, privacy policies, and terms of service. These define how the business interacts with customers and sets expectations for service delivery and compliance.

The metadata generating and storing component 260 is configured to generate metadata for each data file based on one or more rules associated with each data file. For each file, the component 260 is configured to generate metadata based on specific rules associated with that file. The metadata generation can be performed using either a large language model or a classification model to analyze and tag (via metadata) the content appropriately. These rules guide how the metadata is structured and what attributes are captured for each file. The metadata generating and storing component 260 is further configured to store metadata associated with the plurality of data files in a designated database. This database serves as a centralized repository for all metadata associated with the customer's data files. The storage of metadata allows for efficient retrieval of relevant files when processing user queries.

The model training component 270 is configured to train a machine learning model. In particular, the reranker model can be trained based on the source data associated with a particular customer entity to improve its performance in handling queries related to the customer entity.

Figure 3:
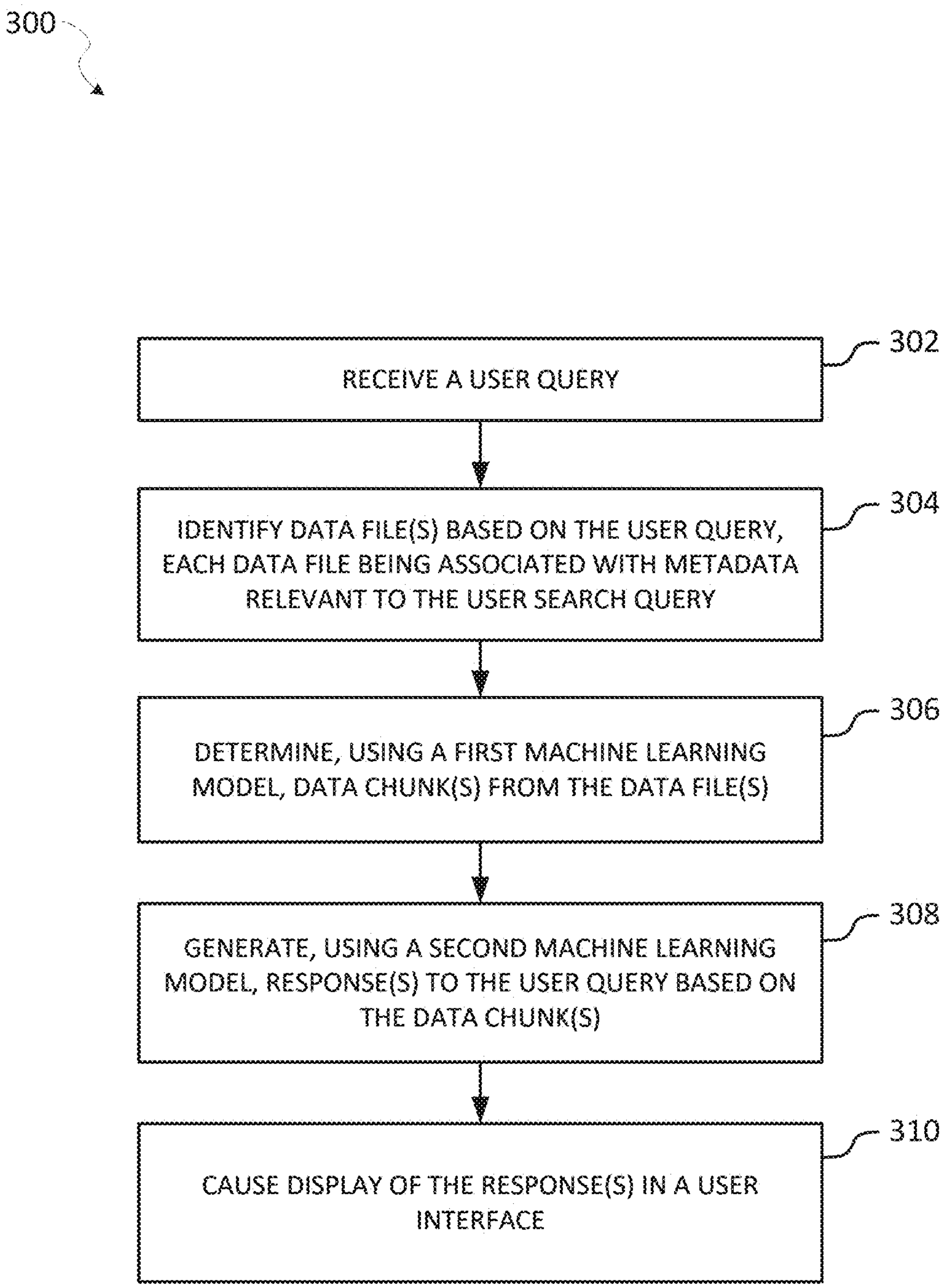
FIG. 3 is a flowchart illustrating an example method for facilitating metadata-based data retrieval and content generation using machine learning and large language model (LLM) technologies, according to various examples of the present disclosure.

FIG. 3 is a flowchart illustrating an example method 300 for facilitating metadata-based data retrieval and content generation using machine learning and large language model (LLM) technologies, according to various examples of the present disclosure. It will be understood that example methods described herein may be performed by a machine in accordance with some examples. For example, method 300 can be performed by the data management system 122 described with respect to FIG. 1, the data management system 212 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among examples, including performing certain operations in parallel.

At operation 302, a processor receives user queries. A user query can refer to the term or phrase that a customer (also referred to as customer entity) types into a user interface when looking for information, such as a product, a service, or answers to questions related to recent transactions.

At operation 304, a processor identifies one or more data files based on a received user query. Each data file can be associated with metadata that is relevant to the user query. Metadata can be generated using a large language model or a classification model.

At operation 306, a processor uses a machine learning model (e.g., the first machine learning model) to determine one or more data chunks from the one or more data files. The first machine learning model can be a reranker model.

At operation 308, a processor uses a machine learning model (e.g., the second machine learning model) to generate one or more responses to the user query. The second machine learning model can be a large language model. The responses can be synthesized answers that are derived from (or generated based on) the content of the data chunks.

In various embodiments, rather than presenting one or more data chunks as the response itself, the processor formulates a coherent, contextually appropriate answer based on the data chunks to address the questions or requirements presented in the query. In other words, the data chunks serve as the source of information, and the response is a synthesized answer based on that content, designed to directly respond to the user's query.

In various embodiments, in response to receiving a user query, a processor identifies source data associated with a customer entity associated with the query and identifies metadata of one or more data files in the source data that match the query. Data chunks from the one or more data files are then determined using the first machine learning model described herein.

At operation 310, a processor causes display of the responses on a user interface. The responses can be displayed via the interface where the original query was submitted.

Though not illustrated, method 300 can include an operation where a graphical user interface is displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 302 through 310 or, alternatively, form part of one or more of operations 302 through 310.

Figure 4:
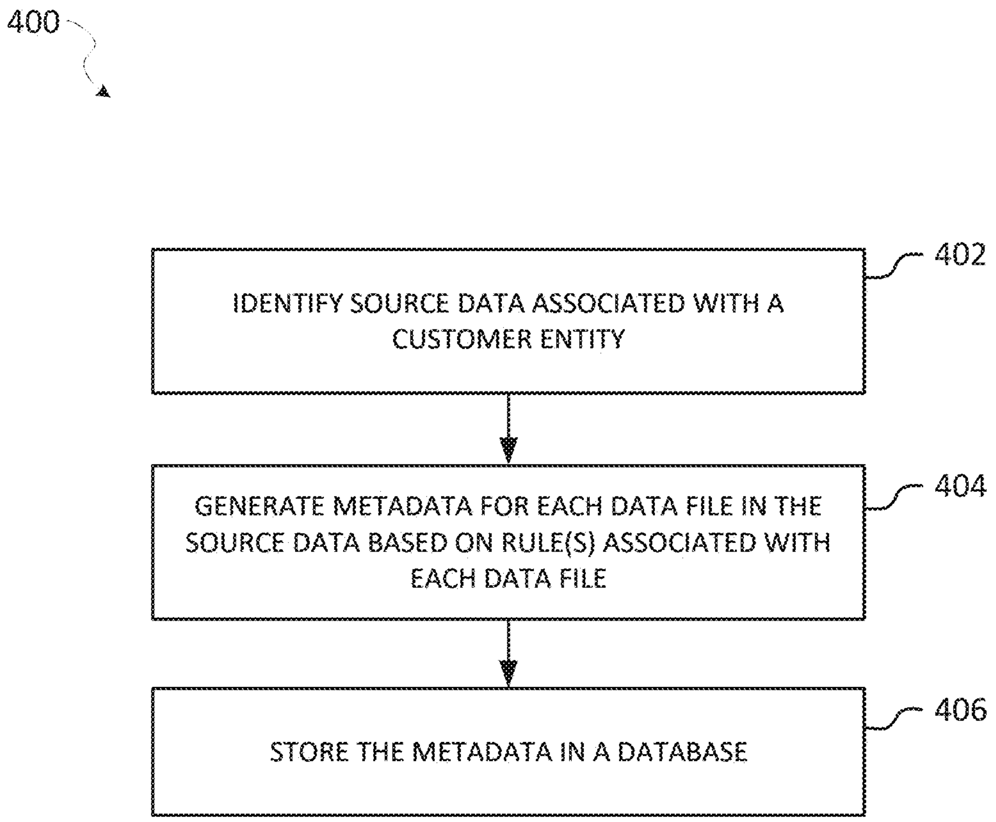
FIG. 4 is a flowchart illustrating an example method for facilitating metadata-based data retrieval and content generation using machine learning and large language model (LLM) technologies, according to various examples of the present disclosure.

FIG. 4 is a flowchart illustrating an example method 400 for facilitating metadata-based data retrieval and content generation using machine learning and large language model (LLM) technologies, according to various examples of the present disclosure. It will be understood that example methods described herein may be performed by a machine in accordance with some examples. For example, method 400 can be performed by the data management system 122 described with respect to FIG. 1, the data management system 212 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among examples, including performing certain operations in parallel. Operations in method 400 can be performed dependently or independently from operations in method 300.

At operation 402, a processor identifies source data associated with a customer entity. Source data can include a plurality of data files related to business rules and policies. Business rules can refer to guidelines, conditions, or criteria that govern how a business operates. These rules help in defining the logic and behavior of a business process. Policies can refer to documented principles or guidelines (e.g., refund policies, shipping policies, privacy policies) that help manage and guide decision-making within the business. These define how the business interacts with customers and sets expectations for service delivery and compliance.

At operation 404, a processor generates metadata for each data file based on one or more rules or policies associated with each specific data file. Metadata is generated for each file, or a collection of files. Operation 404 can be performed using either a large language model or a classification model. These models can analyze and tag (via metadata) the content efficiently. The rules and/or policies involved in each file guide how the metadata is structured and what attributes are captured for that particular file.

At operation 406, a processor stores metadata associated with the data files in a designated database. This database serves as a centralized repository for all metadata associated with the customer's data files, facilitating identification of relevant documents during the query processing phase. This approach allows for efficient document filtering and retrieval without the computational overhead associated with vector database implementations.

Though not illustrated, method 400 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 402 through 406 or, alternatively, form part of one or more of operations 402 through 406.

Figure 5:
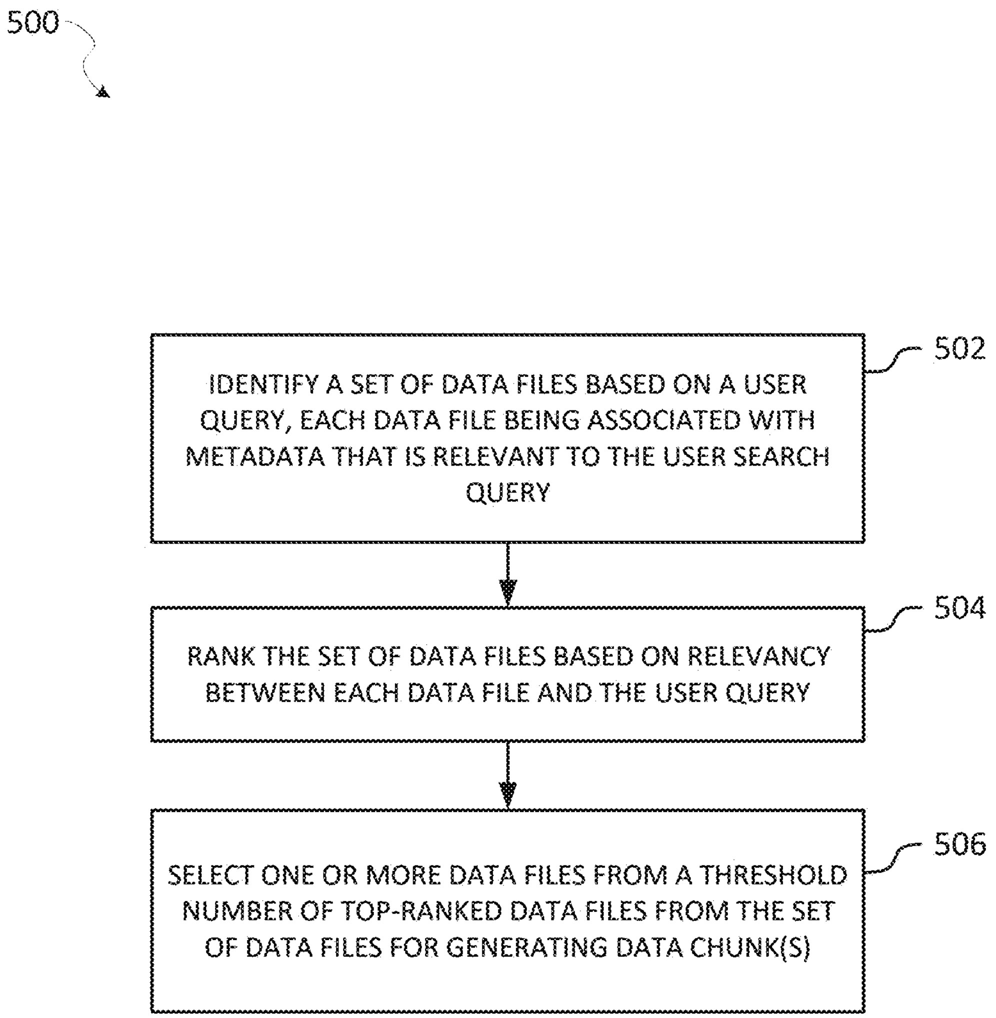
FIG. 5 is a flowchart illustrating an example method for facilitating metadata-based data retrieval and content generation using machine learning and large language model (LLM) technologies, according to various examples of the present disclosure.

FIG. 5 is a flowchart illustrating an example method 500 for facilitating metadata-based data retrieval and content generation using machine learning and large language model (LLM) technologies, according to various examples of the present disclosure. It will be understood that example methods described herein may be performed by a machine in accordance with some examples. For example, method 500 can be performed by the data management system 122 described with respect to FIG. 1, the data management system 212 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among examples, including performing certain operations in parallel. Operations in method 500 can be performed dependently or independently from operations in method 300 and method 400.

At operation 502, a processor identifies a set of data files in response to receiving a user query. Each data file is associated with metadata that is relevant to the user query described herein.

At operation 504, a processor ranks the set of data files based on the relevancy between each data file and the user query. In particular, in response to identifying the set of data files, the processor uses a reranker model to evaluate and rank these files according to their relevance to the original query. The reranker model utilizes pairwise comparisons to assess the relevance of each data file, which provides enhanced search result accuracy compared to traditional vector database similarity searches. This ranking process determines which files are most pertinent to addressing the query.

At operation 506, a processor selects the one or more data files from a threshold number of top-ranked data files from the set of data files for generating the one or more data chunks described herein. This selection process ensures that only the most relevant documents (or portions of documents) are used for generating data chunks.

In various embodiments, a processor generates prompts based on the data chunks from the threshold number of top-ranked data files and uses a large language model to generate responses to the received user query based on the prompts. The prompt generation operations incorporate the relevant content from the data chunks to ensure the large language model has the necessary context to formulate accurate and contextually relevant responses.

Though not illustrated, method 500 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 502 through 506 or, alternatively, form part of one or more of operations 502 through 506.

Figure 6:
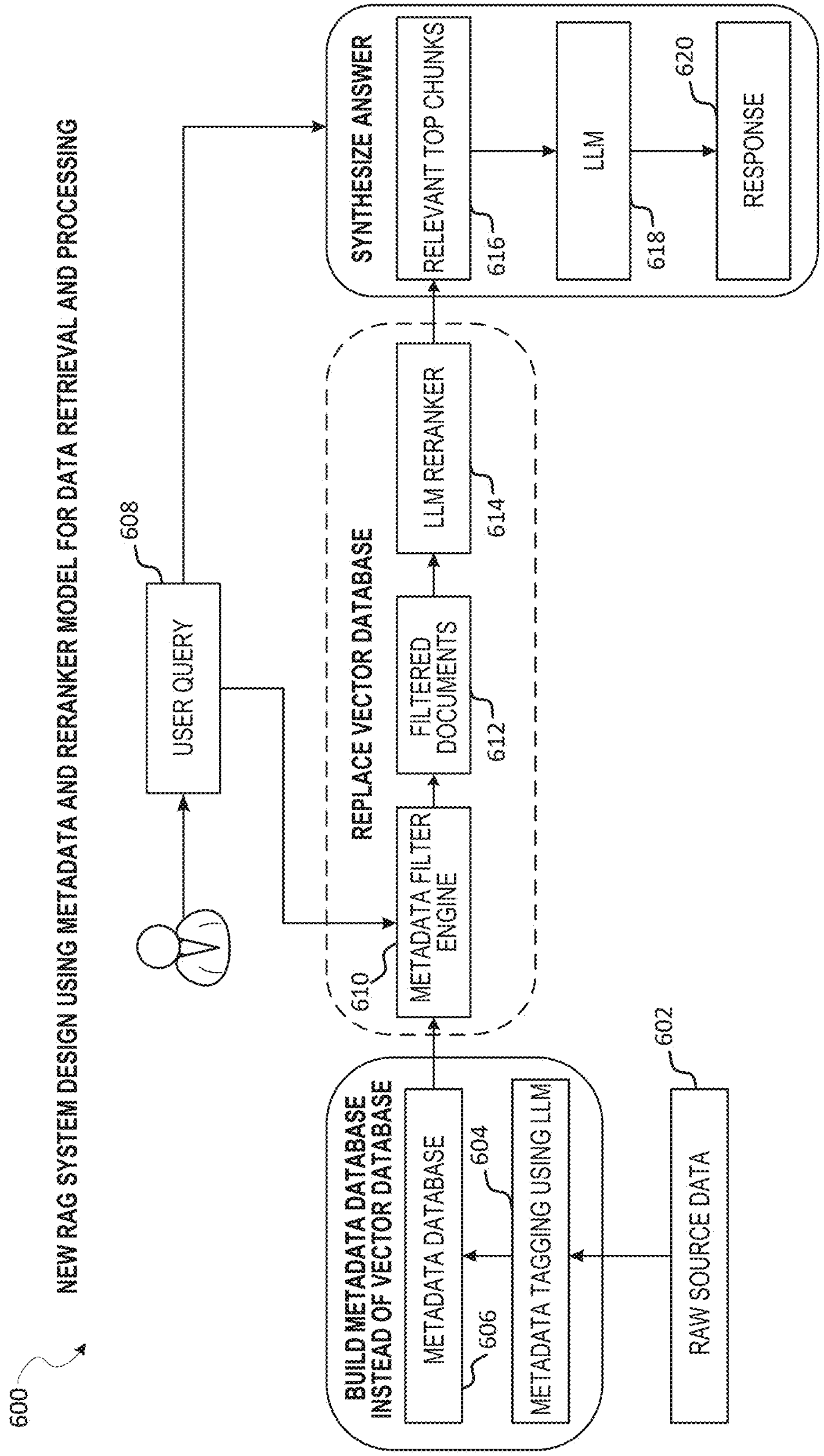
FIG. 6 is a block diagram illustrating an example workflow of a Retrieval-Augmented Generation (RAG) architecture that facilitates metadata-based data retrieval and content generation using machine learning and large language model (LLM) technologies, according to various examples of the present disclosure.

FIG. 6 is a block diagram 600 illustrating an example workflow of a Retrieval-Augmented Generation (RAG) architecture that facilitates metadata-based data retrieval and content generation using machine learning and large language model (LLM) technologies, according to various examples of the present disclosure. As shown, the example workflow begins with raw source data 602 that undergoes metadata generation 604 using a large language model or a classification model. In particular, the metadata generation process includes tagging through the use of a large language model or classification model. The models perform metadata tagging by analyzing and categorizing the information contained within each source data file to create appropriate metadata tags. Tagged data files are stored in a designated database 606, which serves as a centralized repository for efficient retrieval. When a user query 608 is received, it is processed by a metadata filter engine 610 (e.g., data file identifying component 220) that identifies relevant documents (also referred to as data files described herein) based on the metadata attributes.

The metadata-driven approach fundamentally shifts from traditional RAG systems by eliminating the need for vector databases. In traditional approaches, vector databases store and process vast amounts of data in vector format, requiring significant computational resources and leading to increased system complexity and operational costs. Instead of using vector embeddings and similarity searches, the data management system (e.g., systems 122 and 212) filters documents based on metadata attributes that are generated and stored in database 606. This helps reduce system complexity, lowers operational costs, and decreases latency in processing and retrieving data, providing an efficient alternative to vector-based document retrieval.

As shown, the filtered documents 612 (also referred to as matched data files) are then processed by a reranker model 614, which evaluates and ranks the content to identify the most relevant data chunks 616 from the filtered documents 612. These selected data chunks are passed to a large language model 618 that synthesizes appropriate responses 620 to the user query 608.

Figure 7:
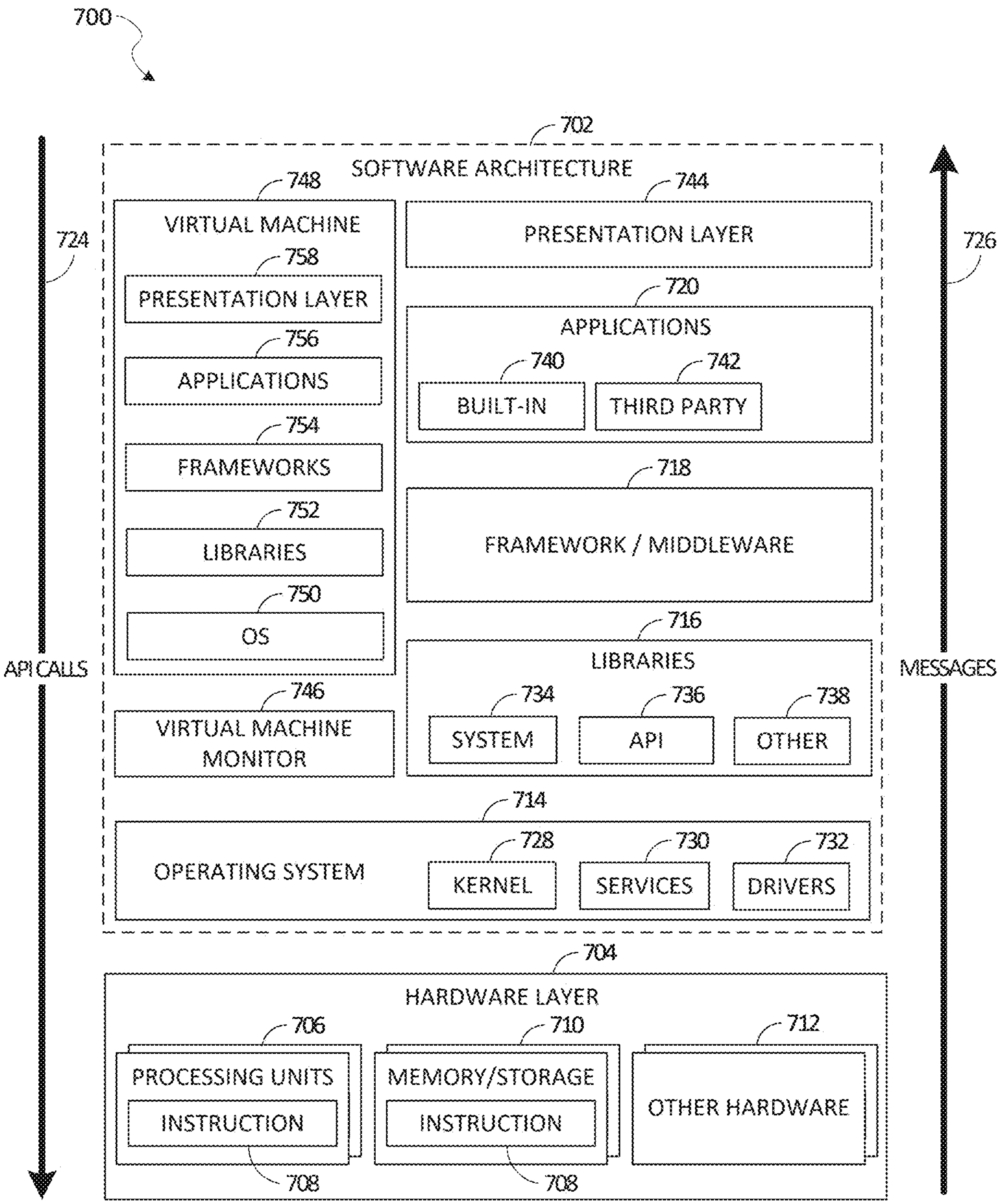
FIG. 7 is a block diagram illustrating a representative software architecture, which may be used in conjunction with various hardware architectures herein described, according to various examples of the present disclosure.

FIG. 7 is a block diagram illustrating an example of a software architecture 702 that may be installed on a machine, according to some examples. FIG. 7 is merely a non-limiting example of software architecture, and it will be appreciated that many other architectures may be implemented to facilitate the functionality described herein. The software architecture 702 may be executing on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers, where each layer provides particular functionality. For example, the software architecture 702 may include layers such as an operating system 714, libraries 716, frameworks/middleware 718, applications 720, and a presentation layer 744. Operationally, the applications 720 or other components within the layers may invoke API calls 724 through the software stack and receive a response, returned values, and so forth (illustrated as messages 726) in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphical user interface functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a home application, a contacts application, a browser application, a book reader application, a location application, a media application, a messaging application, or a game application.

The third-party applications 742 may include any of the built-in applications 740, as well as a broad assortment of other applications. In a specific example, the third-party applications 742 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 742 may invoke the API calls 724 provided by the mobile operating system such as the operating system 714 to facilitate functionality described herein.

The applications 720 may utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with the user.

Some software architectures utilize virtual machines. In the example of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks 754, applications 756, or a presentation layer 758. These layers of software architecture executing within the virtual machine 748 can be the same as corresponding layers previously described or may be different.

Figure 8:
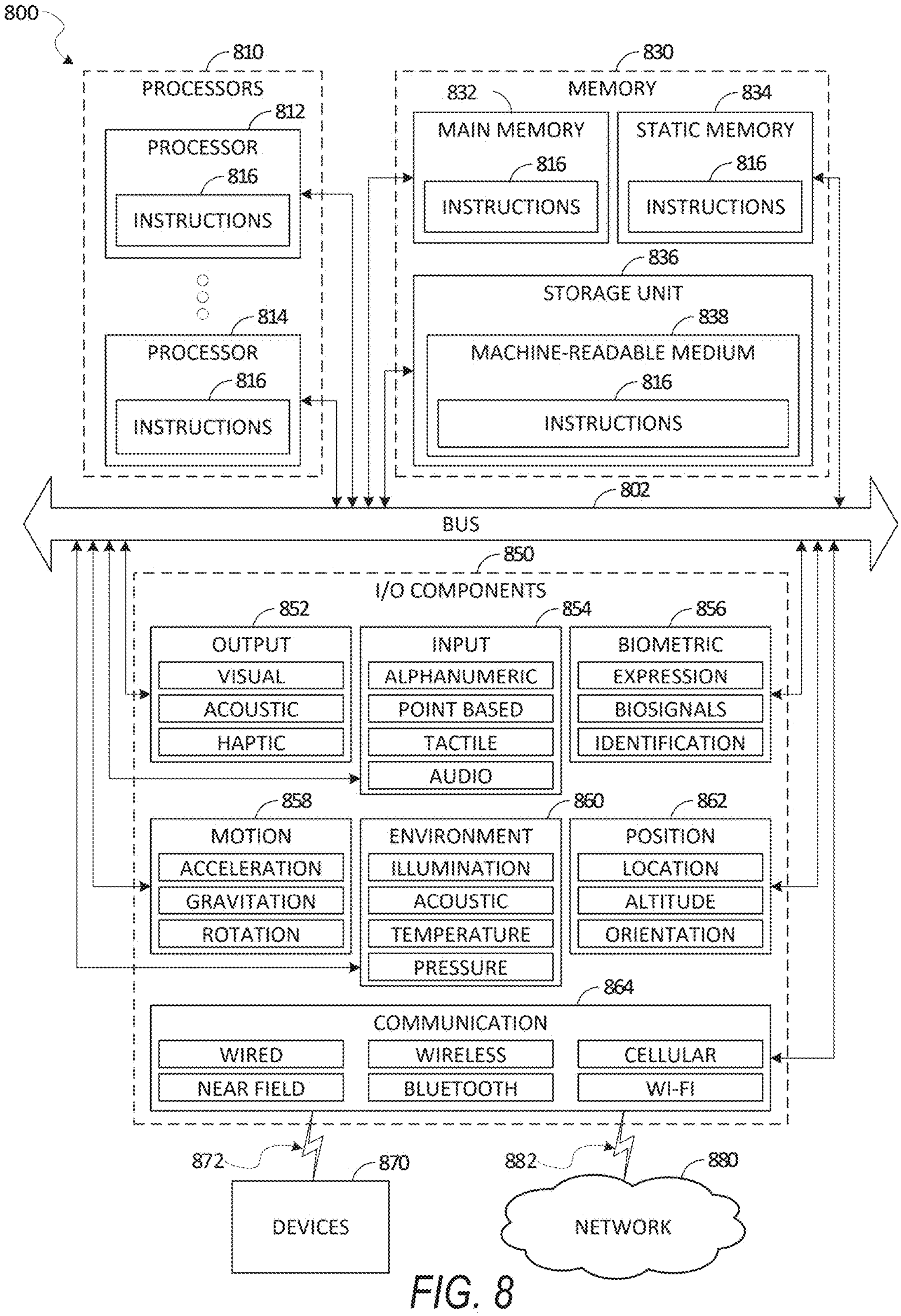
FIG. 8 is a block diagram illustrating components of a machine able to read instructions from a machine storage medium and perform any one or more of the methodologies discussed herein according to various examples of the present disclosure.

FIG. 8 illustrates a diagrammatic representation of a machine 800 in the form of a computer system within which a set of instructions may be executed for causing the machine 800 to perform any one or more of the methodologies discussed herein, according to some examples. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute method 300 described above with respect to FIG. 3, method 400 described above with respect to FIG. 4, method 500 described above with respect to FIG. 5, and method 600 described above with respect to FIG. 6. he instructions 816 transform the general, non-programmed machine 800 into a particular machine 800 programmed to carry out the described and illustrated functions in the manner described. In alternative examples, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In some examples, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 850 may include biometric components 856, motion components 858, environmental components 860, or position components 862, among a wide array of other components. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies.

The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Certain examples are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some examples, the processors 810 or processor-implemented modules are located in a single geographic location (e.g., within a home environment, an office environment, or a server farm). In other example embodiments, the processors or processor-implemented modules are distributed across a number of geographic locations.

The various memories (i.e., 830, 832, 834, and/or the memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In some examples, one or more portions of the network 880 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated.

Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:

a memory storing instructions; and one or more hardware processors communicatively coupled to the memory and configured by the instructions to perform operations comprising:

identifying source data associated with a customer entity, the source data including a plurality of data files, and generating, using a large language model or a classification model, metadata for each data file of the plurality of data files based on one or more rules or policies associated with the data file, each rule or policy representing a business rule or a business policy of the customer entity, and storing the generated metadata in a database;

receiving a user query;

identifying from the plurality of data files one or more data files based on matching the metadata stored in the database to the user query, each data file being associated with metadata that is relevant to the user query;

determining, using a first machine learning model comprising a reranker model, one or more data chunks from the one or more data files based on the metadata, the determining comprising using pairwise comparisons performed by the reranker model to assess contextual relevance between the user query and the one or more data files according to an enhanced Retrieval-Augmented Generation (RAG) approach that retrieves and ranks the one or more data files and the one or more data chunks without performing a vector similarity search over vector embeddings of the plurality of data files, the pairwise comparisons comprising the reranker model computing, for each data file of the one or more data files, a respective relevance score representative of contextual relevance between the user query and the data file, and ranking the one or more data files based on the respective relevance scores, the one or more data chunks comprising data content determined as exceeding a contextual relevance threshold with respect to the user query; and generating, using a second machine learning model comprising a large language model, a response to the user query, the response being derived from the data content included in the one or more data chunks.

2. The system of claim 1, wherein the operations comprise:

causing display of the response on a user interface via which the user query was received.

3. The system of claim 1, wherein the metadata is generated and stored in the database prior to receipt of the user query, such that no vector embedding of any of the plurality of data files is generated by the system during processing of the user query.

4. The system of claim 1, wherein generating the metadata for each data file comprises generating, by the large language model or the classification model, one or more metadata tags representing the one or more rules or policies associated with the data file, the one or more metadata tags being stored in association with an identifier of the data file in the database.

5. The system of claim 1, wherein the operations comprise:

in response to receiving the user query, determining one or more rules associated with the user query, the one or more rules associated with the user query corresponding to the business rules or business policies of the customer entity represented in the metadata; and filtering the plurality of data files to identify the one or more data files based on direct matching of the one or more rules associated with the user query against the metadata stored in the database, each data file in the one or more data files being associated with metadata that represents the one or more rules.

6. The system of claim 1, wherein the operations comprise:

training the first machine learning model, by the customer entity, based on the source data associated with the customer entity, such that the pairwise comparisons performed by the reranker model are customized to the business rules or business policies of the customer entity.

7. The system of claim 1, wherein the operations comprise:

identifying a set of data files based on the user query, each data file being associated with metadata that is relevant to the user query;

ranking the set of data files based on relevancy between each data file and the user query, the ranking being performed by the reranker model using pairwise comparisons of the metadata associated with each data file against the user query and without computing a vector embedding of any data file in the set of data files; and selecting the one or more data files from a threshold number of top-ranked data files from the set of data files for generating the one or more data chunks.

8. The system of claim 1, wherein the operations comprise:

generating a prompt based on the one or more data chunks, the prompt comprising text content of the one or more data chunks without converting the text content to vector embeddings; and generating, using the second machine learning model, the response to the user query based on the prompt.

9. A method comprising:

identifying source data associated with a customer entity, the source data including a plurality of data files, and generating, using a large language model or a classification model, metadata for each data file of the plurality of data files based on one or more rules or policies associated with the data file, each rule or policy representing a business rule or a business policy of the customer entity, and storing the generated metadata in a database;

receiving a user query;

identifying from the plurality of data files one or more data files based on matching the metadata stored in the database to the user query, each data file being associated with metadata that is relevant to the user query;

determining, using a first machine learning model comprising a reranker model, one or more data chunks from the one or more data files based on the metadata, the determining comprising using pairwise comparisons performed by the reranker model to assess contextual relevance between the user query and the one or more data files according to an enhanced Retrieval-Augmented Generation (RAG) approach that retrieves and ranks the one or more data files and the one or more data chunks without performing a vector similarity search over vector embeddings of the plurality of data files, the pairwise comparisons comprising the reranker model computing, for each data file of the one or more data files, a respective relevance score representative of contextual relevance between the user query and the data file, and ranking the one or more data files based on the respective relevance scores, the one or more data chunks comprising data content determined as exceeding a contextual relevance threshold with respect to the user query; and generating, using a second machine learning model comprising a large language model, a response to the user query, the response being derived from the data content included in the one or more data chunks.

10. The method of claim 9, comprising:

causing display of the response on a user interface via which the user query was received.

11. The method of claim 9, wherein the metadata is generated and stored in the database prior to receipt of the user query, such that no vector embedding of any of the plurality of data files is generated during processing of the user query.

12. The method of claim 9, wherein generating the metadata for each data file comprises generating, by the large language model or the classification model, one or more metadata tags representing the one or more rules or policies associated with the data file, the one or more metadata tags being stored in association with an identifier of the data file in the database.

13. The method of claim 9, comprising:

in response to receiving the user query, determining one or more rules associated with the user query, the one or more rules associated with the user query corresponding to the business rules or business policies of the customer entity represented in the metadata; and filtering the plurality of data files to identify the one or more data files based on direct matching of the one or more rules associated with the user query against the metadata stored in the database, without performing a vector similarity search, each file in the one or more data files being associated with metadata that represents the one or more rules.

14. The method of claim 9, comprising:

training the first machine learning model, by the customer entity, based on the source data associated with the customer entity, such that the pairwise comparisons performed by the reranker model are customized to the business rules or business policies of the customer entity.

15. The method of claim 9, comprising:

identifying a set of data files based on the user query, each data file being associated with metadata that is relevant to the user query;

ranking the set of data files based on relevancy between each data file and the user query, the ranking being performed by the reranker model using pairwise comparisons of the metadata associated with each data file against the user query and without computing a vector embedding of any data file in the set of data files; and selecting the one or more data files from a threshold number of top-ranked data files from the set of data files for generating the one or more data chunks.

16. The method of claim 9, comprising:

generating a prompt based on the one or more data chunks, the prompt comprising text content of the one or more data chunks without converting the text content to vector embeddings; and generating, using the second machine learning model, the response to the user query based on the prompt.

17. A computer-storage medium comprising instructions that, when executed by a processing device, cause the processing device to perform operations comprising:

identifying source data associated with a customer entity, the source data including a plurality of data files, and generating, using a large language model or a classification model, metadata for each data file of the plurality of data files based on one or more rules or policies associated with the data file, each rule or policy representing a business rule or a business policy of the customer entity, and storing the generated metadata in a database;

receiving a user query;

identifying from the plurality of data files one or more data files based on matching the metadata stored in the database to the user query, each data file being associated with metadata that is relevant to the user query;

determining, using a first machine learning model comprising a reranker model, one or more data chunks from the one or more data files based on the metadata, the determining comprising using pairwise comparisons performed by the reranker model to assess contextual relevance between the user query and the one or more data files according to an enhanced Retrieval-Augmented Generation (RAG) approach that retrieves and ranks the one or more data files and the one or more data chunks without performing a vector similarity search over vector embeddings of the plurality of data files, the pairwise comparisons comprising the reranker model computing, for each data file of the one or more data files, a respective relevance score representative of contextual relevance between the user query and the data file, and ranking the one or more data files based on the respective relevance scores, the one or more data chunks comprising data content determined as exceeding a contextual relevance threshold with respect to the user query; and generating, using a second machine learning model comprising a large language model, a response to the user query, the response being derived from the data content included in the one or more data chunks.

18. The system of claim 1, wherein the operations comprise:

providing the metadata stored in the database to a metadata filter engine that identifies the one or more data files based on matching the metadata to the user query; and providing the one or more data files identified by the metadata filter engine, as a filtered subset of the plurality of data files, as input to the reranker model, the reranker model performing the pairwise comparisons only on the filtered subset and not on any data file of the plurality of data files that is excluded from the filtered subset by the metadata filter engine.

19. The method of claim 9, wherein the source data associated with the customer entity comprises one or more business documents of the customer entity, the one or more business documents describing the one or more business rules or business policies of the customer entity, and wherein generating the metadata comprises analyzing, by the large language model or the classification model, content of the one or more business documents to produce, for each data file of the plurality of data files, one or more metadata tags representing rules or policies described in the data file.

20. The computer-storage medium of claim 17, wherein the operations comprise:

causing the second machine learning model to generate the response based on the data content of the one or more data chunks rather than based on pre-trained knowledge of the second machine learning model that is independent of the source data associated with the customer entity.

* * * * *